United States Patent [19]
Jorion et al.

[11] Patent Number: 5,884,234
[45] Date of Patent: Mar. 16, 1999

[54] METHOD FOR PULSE SHAPE REGULATION AND DISCRIMINATION IN A NUCLEAR SPECTROSCOPY SYSTEM

[75] Inventors: Bruno Jorion, Houston; Christian Stoller, Kingwood, both of Tex.

[73] Assignee: Schlumberger Technology Corporation, Houston, Tex.

[21] Appl. No.: 705,389

[22] Filed: Aug. 30, 1996

[51] Int. Cl.$^6$ ........................................ G01T 7/02
[52] U.S. Cl. .................. 702/66; 702/67; 702/78; 702/79; 250/395; 250/363.07
[58] Field of Search ....................... 364/486, 178, 364/422, 480, 481, 484, 485, 487, 448, 500, 551.01, 527, 555, 569, 804, 506, 571.01, 602; 377/19, 20; 378/120, 87, 62, 108; 250/267, 256, 253, 261, 262, 368, 369, 269.1, 269.3, 269.4, 269.6, 269.8, 363.01, 370.06, 370.08, 390.01, 390.07, 390.08, 252.1 R, 336.1, 395, 363.07; 702/66, 67, 69, 71, 73, 74, 78, 79, 7, 8; 324/76.13–76.15; 327/13, 17, 18, 20, 78, 80; 371/6

[56] References Cited

U.S. PATENT DOCUMENTS

| | | | |
|---|---|---|---|
| 4,605,854 | 8/1986 | Smith, Jr. ........................... | 250/269.6 |
| 4,837,437 | 6/1989 | Forster et al. ...................... | 250/336.1 |
| 5,067,090 | 11/1991 | Seeman ............................. | 364/486 |
| 5,132,540 | 7/1992 | Adolph et al. ..................... | 250/369 |
| 5,210,423 | 5/1993 | Arseneav .......................... | 250/369 |
| 5,304,808 | 4/1994 | Odell ............................... | 250/395 |
| 5,347,129 | 9/1994 | Miller et al. ...................... | 250/336.1 |
| 5,532,944 | 7/1996 | Battista ............................. | 364/481 |

FOREIGN PATENT DOCUMENTS

| | | |
|---|---|---|
| 0396464 A2 | 4/1990 | European Pat. Off. . |
| 0410828 A2 | 6/1990 | European Pat. Off. . |

*Primary Examiner*—Hal Dodge Wachsman
*Attorney, Agent, or Firm*—John J. Ryberg; Brigitte L. Jeffery

[57] ABSTRACT

The present invention is based on a digital pulse sampling and detection technique which samples a nuclear pulse train at a constant frequency asynchronously with the actual pulses, which occur at random times. The shape of pulses representative of the interaction of nuclear particles or gamma-rays with a nuclear detector is analyzed to determine the pulse length. Nuclear particles or gamma-rays are detected. A signal is formed containing pulses representative of the particles or gamma-rays. The pulses are sampled at a constant frequency to form a digital image of the pulse train. The pulse length is determined by counting the number of pulses with a first number of consecutive samples above a threshold and by counting the number of pulses with a second number of consecutive samples above the threshold. A ratio of the first and second number of consecutive samples is obtained. The ratio is used to adjust the pulse length.

22 Claims, 7 Drawing Sheets

FIG.1
(PRIOR ART)
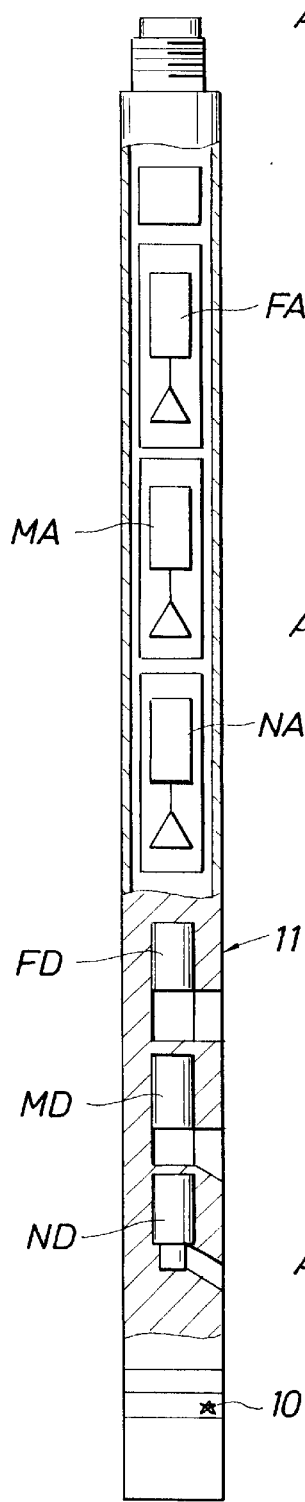
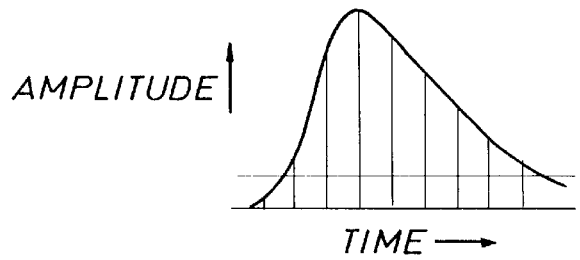
FIG. 3a
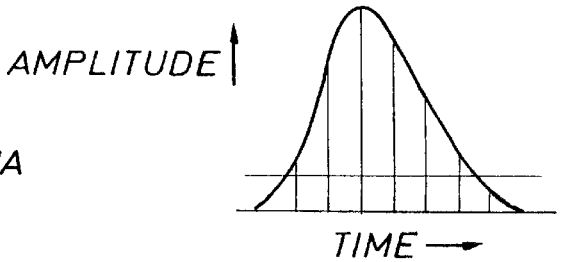
FIG. 3b
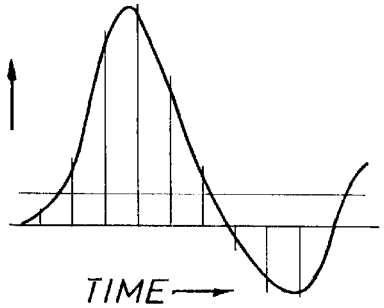
FIG. 3c

METHOD FOR PULSE SHAPE REGULATION AND DISCRIMINATION IN A NUCLEAR SPECTROSCOPY SYSTEM

FIELD OF THE INVENTION

This invention relates to a method of detection and processing of pulse signals and in particular to the regulation and the discrimination of the pulse shape of the signals in a nuclear spectroscopy system.

BACKGROUND OF THE INVENTION

In nuclear spectroscopy applications, the energy of incident nuclear particles is measured. In many cases this measurement is accomplished by measuring the energy deposited by the particle in a nuclear detector. The energy is from a continuous pulse train that is in theory infinite in length. To obtain a signal that represents the total energy deposited in the detector typically requires the integration of a current signal. In general, a compromise between the charge integration time and the need to process a high pulse rate has to be found. Generally, the detection of a series of distinct pulses, at low count rate, offers very few problems, therefore, conventional detection equipment may be employed. However, sometimes the frequency or repetition rate of the pulses varies over a wide range such that the spacing between successive pulses is sometimes very short. Thus, the random character and high rates of occurrence of these signals necessarily produce a "pile-up" or a sequence of overlapping pulses at the amplifier unit. Usually, a pile-up of this sort results in a single pulse that is composed of two or more amplified individual detected signals, each of which is indicative of a detected gamma ray, neutron or other nuclear radiation. The pile-up phenomenon results in data losses and/or spectrum distortion. Accordingly, it is of importance, first to distinguish individual pulses from pile-up pulses and second when pile-up pulses have been detected, to adequately process these pulses in order to restore the original distinct pulses, or at least to reject pulses which are the result of pile up and do not represent the energy deposited by a single particle in a nuclear detector.

These pulses are analyzed using a nuclear spectrum analyzer or pulse height analyzer. A nuclear spectrum analyzer may include a scintillation detector, a photomultiplier, a coupler (usually a capacitor), a preamplifier, a pulse shaping unit and a pulse height analyzer. Known pulse height analyzers comprise successively a pulse detector (optionally a pile-up detector and a pile-up process unit), an analog-to-digital converter (ADC) and a memory, the different channels of which correspond to a given amplitude level of the detected pulse. The pulse height analyzer may also comprise, upstream of the ADC, an input gate preventing pulses from reaching the ADC when the latter is busy, i.e. when the ADC is processing a detected pulse.

As previously stated, if two pulses arrive within the same integration interval, a biased "sum" pulse (pile-up) will be generated. This pile-up results not only in spectral distortion but in the failure to detect one of the pulses. Pulse shape can also affect the detection of pile-ups. Therefore, a compromise between integration time and count rate capability is made by a pulse shaping device which precedes the digitization of the pulse and its accumulation in the spectrum (memory). New high speed electronics provide high throughput nuclear spectroscopy acquisition. However, such systems are more sensitive to changes in the pulse shape and require that the shape of the electronic signal remain unchanged over a large range of operating conditions. The main factor which can influence the shape of the pulse is the change of the characteristics of electronic components and nuclear sensors over time and/or with temperature.

One approach to spectral analysis is a digital integration technique described in U.S. Pat. No. 5,067,090, issued to Bronislaw Seeman. In this nuclear spectroscopy technique, pulse height analysis is performed for a pulse with an amplitude that is a measure of the energy of particles, such as gamma rays, collected by said radiation detector by (1) continuously (asynchronously) converting the detected signal to digital samples at a given rate; and (2) processing each of the digital samples so as to form a digital image of each detected nuclear event. This method includes the step of detecting the arrival of a pulse, by comparing each incoming sample to a threshold value, so as to determine whether the sample is representative of a pulse. More specifically, the difference between the incoming sample value and the base signal which is free of nuclear events, is calculated and compared to the threshold. The time of arrival of any detected pulse is recorded. Moreover, the base signal value (baseline) is continuously estimated and updated at each sample time arrival, so as to generate a current base signal value; preferably, the updated value is a weighted average of the incoming sample with the preceding sample or samples. Once a pulse has been detected, the energy of said pulse is calculated by summing the difference between each sample value (representing the pulse) and the current base signal value, the sum being continuously accumulated in a register. During the energy calculation, the accumulated sum is compared to a preset value and said register is reset in case of overflow. Advantageously, for each pulse, the sample just proceeding the first sample representative of the pulse, as well as the sample just following the last sample representative of the pulse, are both taken in to account for said pulse energy calculation.

Seeman further includes the step of detecting a stack of successive pulses close one to the other in time. The detection step involves counting the number of samples representative of a detected nuclear event and comparing the count to a predetermined maximum count value. The sampling step can be performed by a flash analog-to-digital converter (ADC).

The digital integration technique in Seeman, which in essence computes the area under the pulse is sensitive to the shape of the pulse. The pulse shape is influenced by changes in electronic components with temperature or age as well as by changes in the pulse response of the nuclear detector. Most scintillation detectors will emit a much more rapid pulse at elevated temperature than at room temperature.

A possible technique for stabilizing the pulse shape is described in U. S. Pat. No. 5,132,540 issued to R. Adolph and B. A. Roscoe. This method regulates the pulse shape by keeping track of the number of pile-up pulses in a given relationship and comparing that number to the total number of counts. This method has the disadvantage of being slow and unreliable at low count rates, where the total number of pile-up pulses is very small.

Other applications in nuclear measurements require discrimination between interactions by distinguishing the shape of the pulse from the nuclear sensor. At the present time, most pulse shape discrimination relies on complex and often unstable analog circuits. Unfortunately, the use of these techniques requires substantial expertise. A need still remains for a simple method that can distinguish between pulses of various lengths and pile-up pulses.

SUMMARY OF THE INVENTION

One object of this invention is develop a method that will regulate the shape of a pulse in a nuclear spectroscopy system.

A second object of this invention is to develop a method that will distinguish between regular pulses and pile-ups.

Another object of this invention is to provide a method that will analyze signal pulse shapes at high speed and with high accuracy.

The present invention is based on a digital sampling technique which samples the nuclear pulse train of a signal at a constant rate. The fact that many samples are available for each pulse allows many pulse train analysis operations, such as: 1) pulse integration (area determination under pulse), 2) pulse shape discrimination, 3) pile-up rejection and 4) time of arrival determination (multiscaler analysis) which traditionally were done through complex analog and digital circuits to be done in a compact digital arrangement. This invention addresses the first 3 aspects of digital pulse train analysis.

Digital sampling and integration is a modern method of acquiring nuclear spectroscopy data. The technique's main advantage is very high speed and the elimination of the traditional sample and hold circuits in nuclear analog-to-digital converters (ADCs). FIG. 2 shows the basic principle of the digital integrator. The signal from the detector is sampled asynchronously at a given sampling frequency. The pulse detection logic is triggered, when a pulse passes a predetermined digital threshold. One possible implementation of the approach adds all the samples above the threshold, plus the first sample preceding and the first sample following the pulse. Pulses which have more than a preset number of samples (e.g. 6) above the threshold are rejected and counted as pile-ups. Pulse shape compensation (extending or shortening of the pulse) is also implemented based on the number of samples detected during a pulse.

Pile-up rejection is based on a concept similar to U.S. Pat. No. 5, 067,090, which uses pulse shape discrimination to distinguish between regular pulses and pile-up pulses. In this method, regular pulses have 2 to 6 samples above the threshold level. Any pulse with more than 6 samples above the threshold is considered to be a pile-up pulse. In the present invention, the above method is extended by using algorithms involving other information. The algorithms of the present invention can accomplish tasks such as: 1) making the pulse length indicating a pile-up a function of the pulse amplitude, 2) tying the pile-up rejection threshold (number of samples above threshold) to the pulse peak amplitude, 3) using the time from threshold to peak to determine the presence of a pulse, 4) using a generalized approach which assumes that for a given pulse the value of a sample is related to the values of the previous samples in a predetermined manner and 5) using a combination of the above-listed tasks. The present invention provides an improved method of processing pulses and a direct method for pulse shape regulation. The present invention also has the capability to distinguish signals created by neutrons and (unwanted) gamma rays (pulse shape discrimination) or other tasks in nuclear spectroscopy which require distinguishing different pulse shapes. The neutron and gamma ray signals differ from each other in the shape of the pulse emitted by the detector. The ratio between the amplitudes of two components depends on the ionization density of the particles in the scintillation material. In a digital approach, the signals can therefore be distinguished by looking at the ratio of the maximum pulse voltage and the voltage at a later point in time.

BRIEF DESCRIPTION OF THE DRAWINGS

FIG. 1 diagram of the density logging tool implemented in the present invention.

FIG. 3a is an illustration of a sampled pulse that is under-compensated.

FIG. 3b is an illustration of a sampled pulse that has the correct and desired shape.

FIG. 3c is an illustration of a sampled pulse that is over-compensated.

DESCRIPTION OF THE PREFERRED EMBODIMENT

The present invention provides a high speed method to perform pulse shape analysis of signals detected by a tool such as the density logging tool described in FIG. 1. This tool contains a gamma ray source 10, a near-spaced gamma ray detector DN, an intermediate-spaced gamma ray detector DM and a far-spaced gamma ray detector DF. The three gamma ray detectors are of attenuation type, which in the art means that they are all located sufficiently far (more than the mean free path length of gamma rays from the source to the detector, which generally is about five centimeters) from the gamma ray source that the count rates decrease as the densities of the formation and mudcake materials adjacent to them increase. The detectors ND, MD, and FD are located respectively at successively greater distances from the source 10. The source 10 may be any suitable source of gamma rays such as Cesium 137. A high density shielding material 11 such as tungsten surrounds the detectors. Signal analyzers, NA, MA and FA are located above the detectors. Each analyzer analyzes the signal from the corresponding detector.

Figure 2:
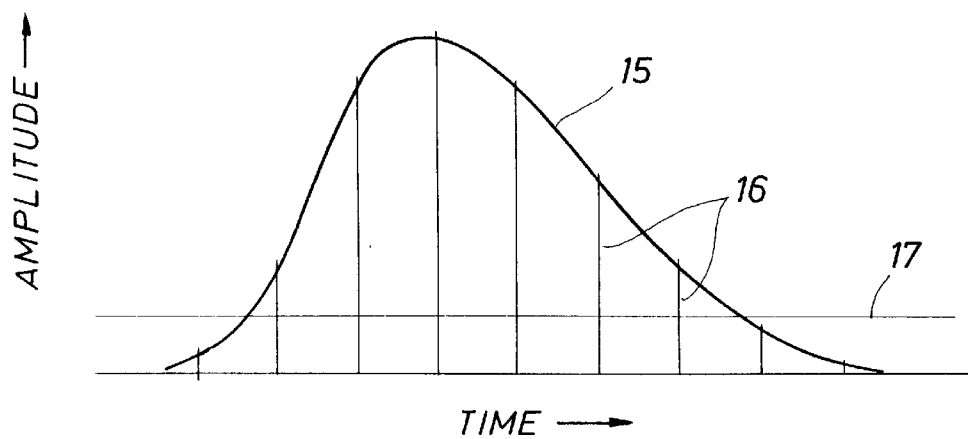
FIG. 2 is an illustration of a sampled pulse.

Referring to FIG. 2, samples 16 from signal 15 are asynchronously taken during each pulse at predetermined sampling frequency. Since the signal is sampled asynchronously steps need to be taken to detect the occurrence of a pulse from the nuclear detector and to assure that the pulse is neither due to electronic or detector noise nor a pile up of two or more pulses occurring within a short time interval. The presence of a pulse is assumed if the sampled signal is above a predetermined (digital) threshold level 17 and remains above this threshold for 2 or more consecutive samples. If more than 6 consecutive samples remain above threshold the pulse is considered a pile up.

The above-described method of pulse detection and discrimination works for pulses with a constant shape.

However, the pulse shape is not always constant and therefore needs to be adjusted in certain situations. Two reasons the pulse shape can change are the change in electronic components with time and temperature and even more importantly the changes in the characteristics of the detectors. For example, a NaI scintillation crystal emits light with a certain decay time. At room temperature, approximately 21° C. (70° F.) this time constant is about 240 Ns. With increasing temperature, the constant gets shorter. This decrease will lead to a shorter, "over-compensated" pulse. FIG. 3 shows the various shapes of pulses. In FIG. 3a, the pulse is too long because the pulse is under-compensated. In FIG. 3b, the pulse has been compensated such that the pulse has the desired shape as shown in FIG. 2. FIG. 3c shows a pulse that is too short (over-compensated). The pulse shapes in FIGS. 3a and 3c must be adjusted to obtain a correct shape. This correction can be achieved by adjusting the pulse shaping filter in the pulse shaping amplifier.

Pulse Shape Compensation Based on Pulse Length

A pulse shape can be compensated based on the pulse length. For a given pulse height, in the absence of noise, the number of samples above threshold is almost constant. There is a little bit of jitter due to the asynchronous nature of the sampling process. However, if noise is superimposed on the pulse, the scatter on the pulse length becomes larger. This result means that even for constant pulse shape there will be pulses with different observed lengths. However, the average number of samples above threshold for a given pulse height is an excellent measure of the pulse length. The average pulse length can then be used in a regulation loop to keep the pulse shape constant. In addition, it is possible to perform the length measurement on a range of pulse amplitudes (instead of on a single amplitude) to increase the amount of dithering and to gain counting statistics.

Figure 4:
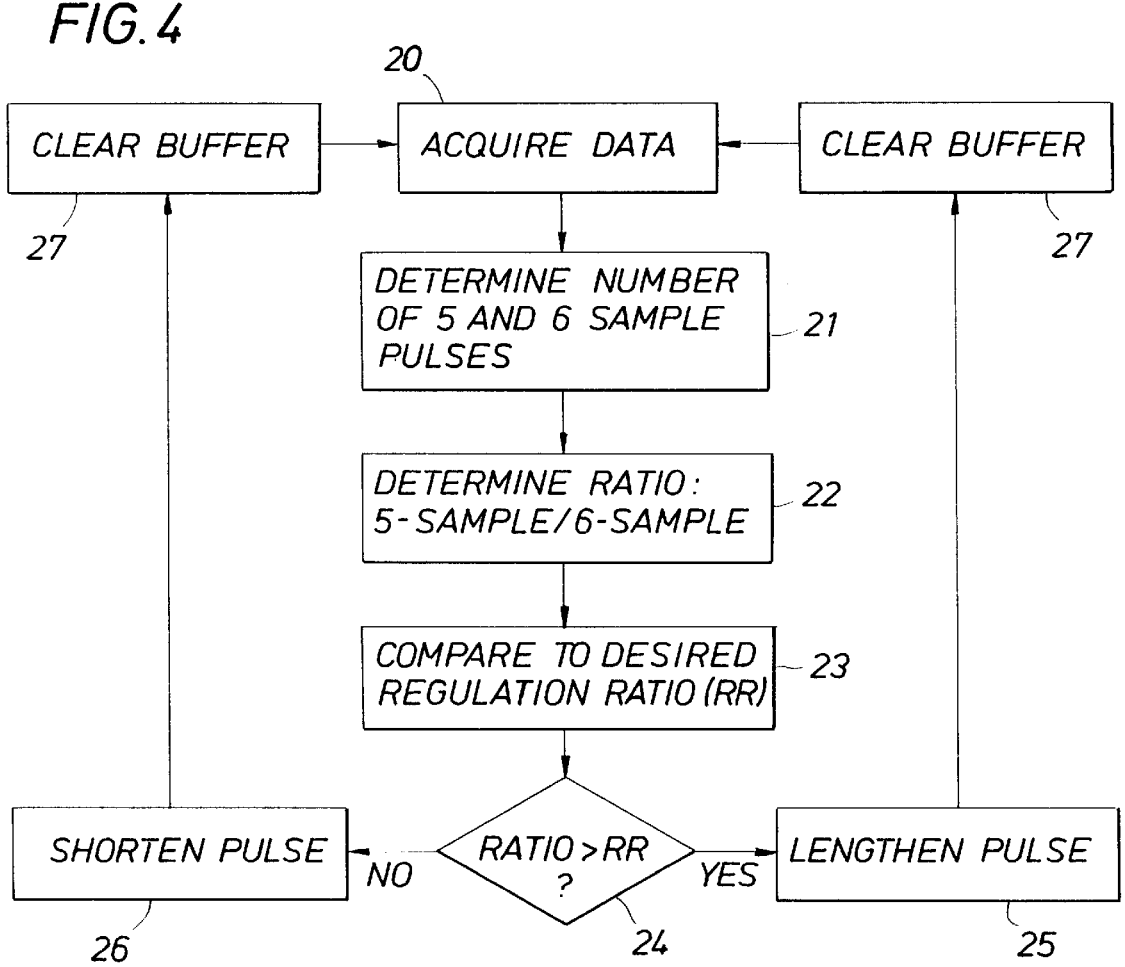
FIG. 4 is a flow diagram of the algorithm that regulates a pulse shape.

FIG. 4 shows a flow diagram of the pulse length compensation method. In this flow diagram, spectral data is acquired from the detected signal 20. Block 21 samples this signal and counts the number of samples to determine the number of consecutive sample amplitudes that are above a predetermined threshold amplitude. The number of five sample pulses and the number of six sample pulses are determined. Block 22 determines the ratio of the number of five sample pulses to six sample pulses. In Block 23, the determined ratio is compared to a previously determined Regulation ratio. If the ratio of five sample pulses to six sample pulses 24 is greater than the Regulation Ratio, then the pulses should be lengthened 25. If the ratio of five sample pulses to six sample pulses 24 is not greater than the Regulation ratio, then the pulses length is shortened 26. After the pulse is shortened or lengthened, the buffers 27 are cleared and the method repeated by acquiring data.

Referring to step 23, the regulation ratio (RR) can be determined experimentally or through theoretical considerations and simulation. In the present invention, the regulation ratio is not necessarily a constant but a function of the total count rate. This comes from the fact that with an increasing count rate, the number of pile-up pulses and hence the number of undetected pile-up pulses increases.

Figure 5:
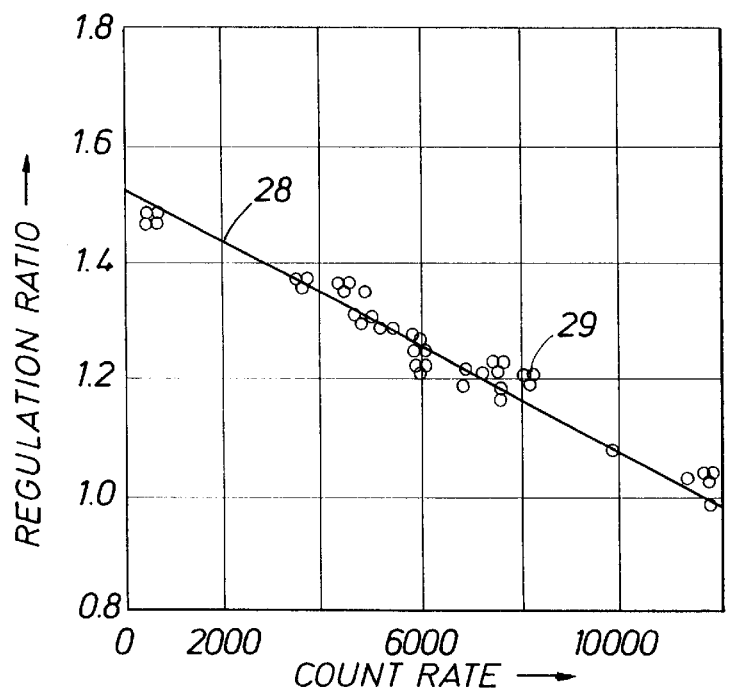
FIG. 5 shows an example of the regulation ratio for low count rates (RR) as a function of count rate for a constant setting of the pulse shape compensation.

Pile-up pulses form by the overlap of two independent pulses which are not sufficiently well separated in time and therefore are detected as one pulse. Pile-ups are on average longer than normal pulses. This means that with increasing count rate the number of 6-sample long pulses increases. For constant pulse shape this reduces the regulation ratio. The regulation ratio for constant pulse shape then becomes more a function of count rate (and to a much lesser extent of spectral shape). In a sample case the regulation ratio then becomes:

$$RR = RR_o + c \cdot TCR$$

where TCR is the total count rate, $RR_o$ the regulation ratio for low count rates, c is a constant and RR is the count rate corrected regulation ratio. FIG. 5 shows an example of the ratio RR as a function of count rate for a constant setting of the pulse shape compensation. In FIG. 5, the vertical axis is the regulation ratio and the horizontal axis is the total sample count rate. The regulation ratio curve is shown as 28 and 29 are actual measurements. It shows that for this case, the regulation ratio is a linear function of count rate.

Pulse Shape Discrimination

Some applications in nuclear spectroscopy need to distinguish signals based on the shape of the electric signal they produce in a nuclear sensor. Traditionally this was accomplished by complex analog circuitry, which needed a significant amount of fine tuning and which was prone to drift. The principle of digital pulse sampling opens this application to digital techniques and digital processing. The sections below give examples of pulse shape discrimination and a more general description of discrimination techniques.

Pile up Rejection Based on Pulse Shape Discrimination

As previously stated, the digital integrator application described in U.S. Pat. No. 5,067,090 uses a pulse shape discrimination technique to distinguish between regular pulses and pile-up pulses. The simple concept of this discrimination technique is as follows:

Regular pulses have 2 to 6 samples above the threshold

Any pulse with more than 6 samples above threshold is a pile-up pulse.

This technique, although successful, can be extended to applications which require shape discrimination based on more sophisticated criteria than pulse length or which do not involve pulse length alone.

Figure 6:
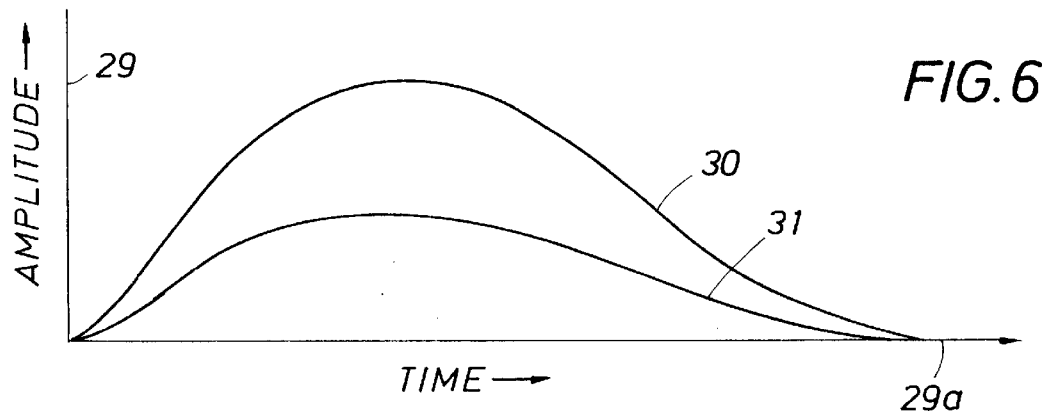
FIG. 6 is illustration of the pulse length indicating pile-up as a function of the pulse amplitude.

One application, shown in FIG. 6, makes the pulse length indicating a pile-up a function of the pulse amplitude. In this embodiment, the number of samples required for determining pulse pile-up of a particular pulse depends on the amplitude 29 of the pulse 29a. As shown, pulse 30 may have an amplitude of 10 and pulse 31 may have an amplitude of 6. Pulse 30 could have a six sample limit to determine a pile-up pulse and pulse 31 could have a four sample limit to determine pulse pile-up. This reflects that fact that a pulse of smaller amplitude will have fewer samples above a predetermined threshold value. Prior to the implementation of this embodiment, a predetermined set of amplitudes and corresponding sample limits are established. This set of amplitudes and corresponding sample limits is accessed during the above-described process. This is important in cases in which the threshold has to be set to a fairly high level to discriminate against noise.

Figure 7:
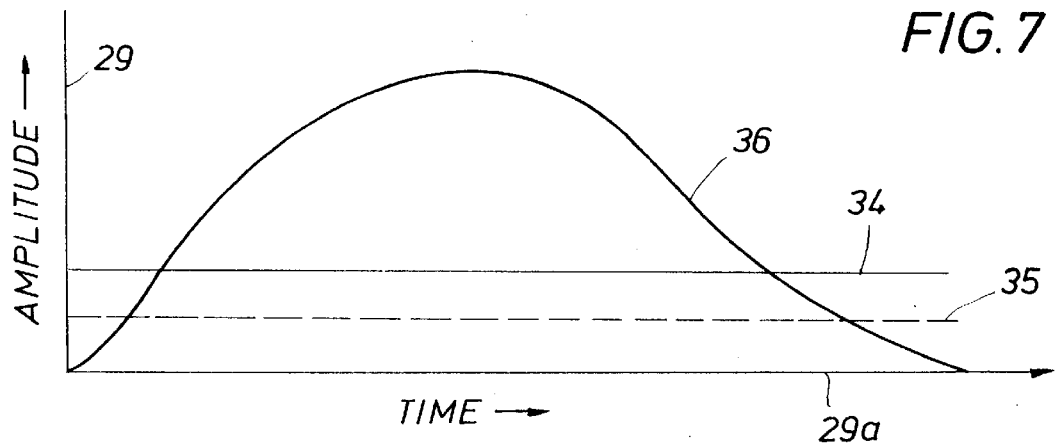
FIG. 7 is an illustration of the invention of tying the pile-up rejection threshold to the pulse peak amplitude.

FIG. 7 shows the results of a technique that ties the pile-up rejection threshold to the pulse peak amplitude. In this embodiment, the threshold level for detecting pulse samples is directly proportional to the amplitude of that pulse. In this implementation the pulse is initially detected using a predetermined threshold. However once the pulse amplitude is determined the threshold is reset to a fraction of the detected amplitude. This insures proper pile up rejection for smaller pulses. In FIG. 7 the threshold 34 belongs to the pulse amplitude 36. For a pulse with half this amplitude the threshold would be reduced to be at a lower level 35. The lower level 35 may have to be limited to avoid erroneous rejection due to noise. This requires that several samples preceding the pulse detection (threshold crossing) be memorized so the pulse train can be reanalyzed with the new threshold.

Figure 8:
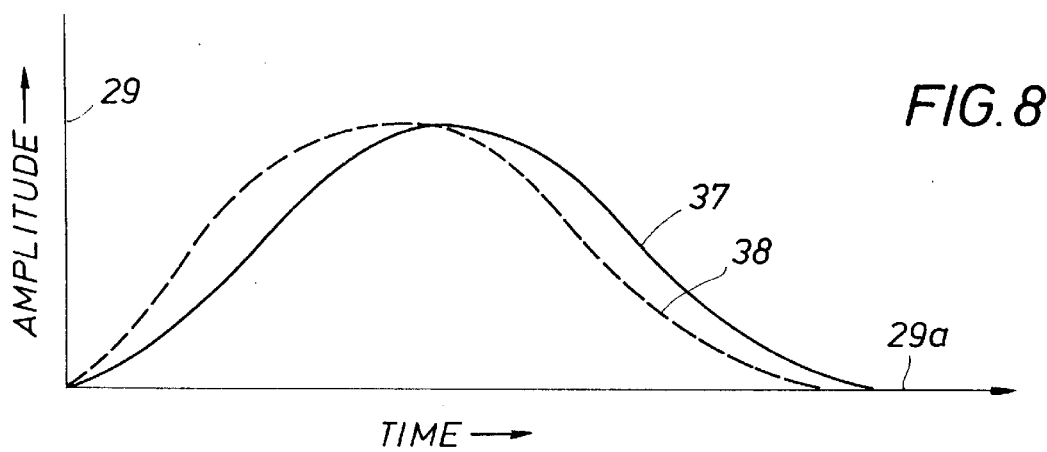
FIG. 8 is an illustration of the invention using the time from threshold to peak to determine the presence of a pulse.

In another embodiment of the present invention, the time from the threshold to the peak value is used to determine the presence of a single pulse. Pile up will often result in a longer time to reach the peak of the pulse. Pile up rejection can then be based also on detection of pulses with too long a time-to-peak. FIG. 8. shows two pulses, one with the correct shape 38 and a second one 37 having incorrect pulse shape. The time to peak can be measured in different ways:
1. The order of the sample having the largest amplitude can be determined. This is a very coarse measurement of the time to peak,
2. The centroid of the peak can be determined:

$$\text{centroid} = (\text{sum}(H_i * i))/n$$

where i is the number of the sample above threshold, H the height of the sample and n is the total number of samples above threshold. In a different implementation a predetermined number of samples before and after the threshold could be included in the threshold computation. Pulses which have a centroid within a predetermined range are accepted and their area and/or their time-to-peak is stored in a histogram. Other pulses are rejected and their area and or time-to-peak can be stored in a separate histogram. The average time-to-peak can be used to regulate the pulse shape.

Figure 9A:
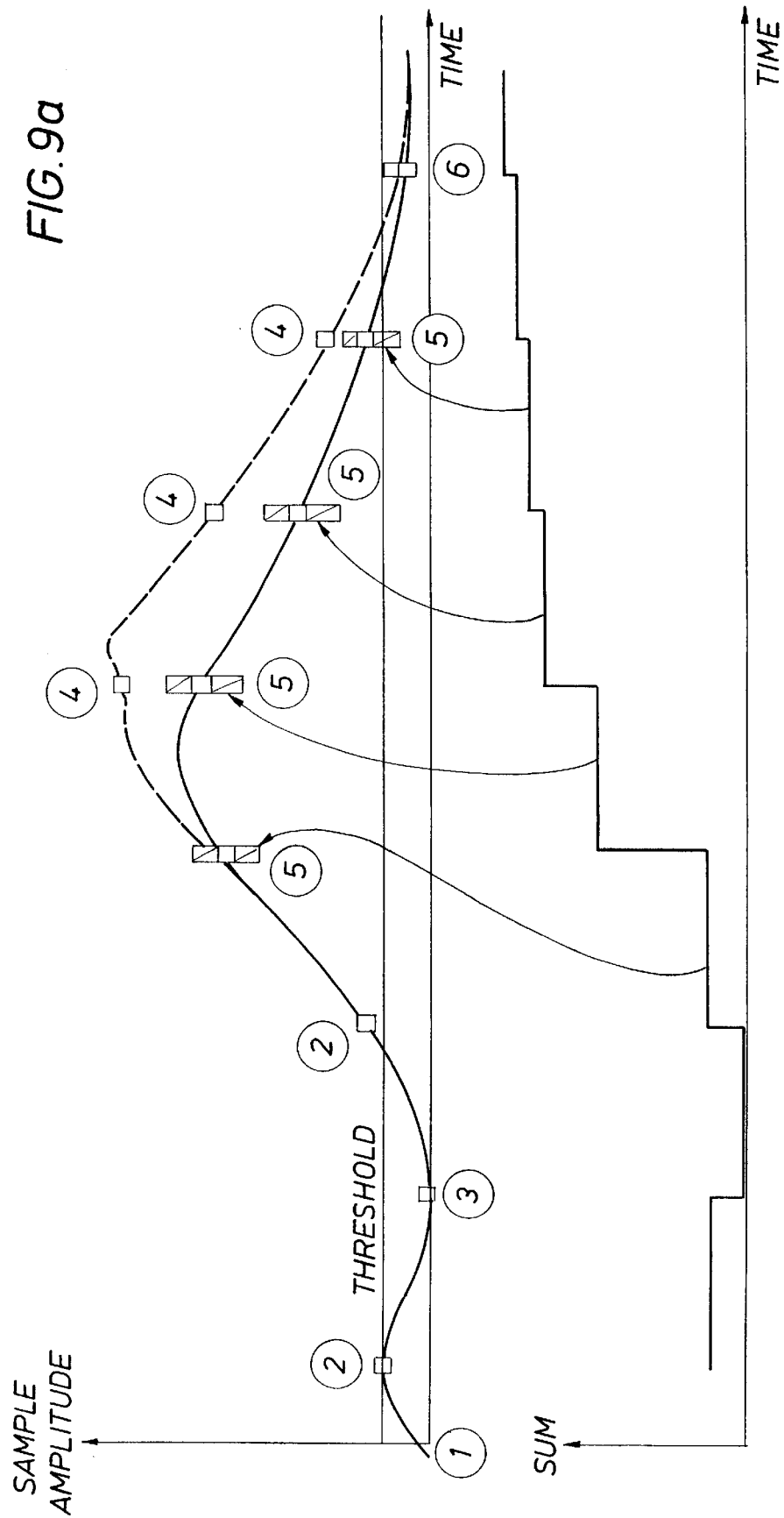
FIG. 9a is an illustration of the invention in which for a given pulse shape the value of a sample is related to the values of the previous samples.
Figure 9B:
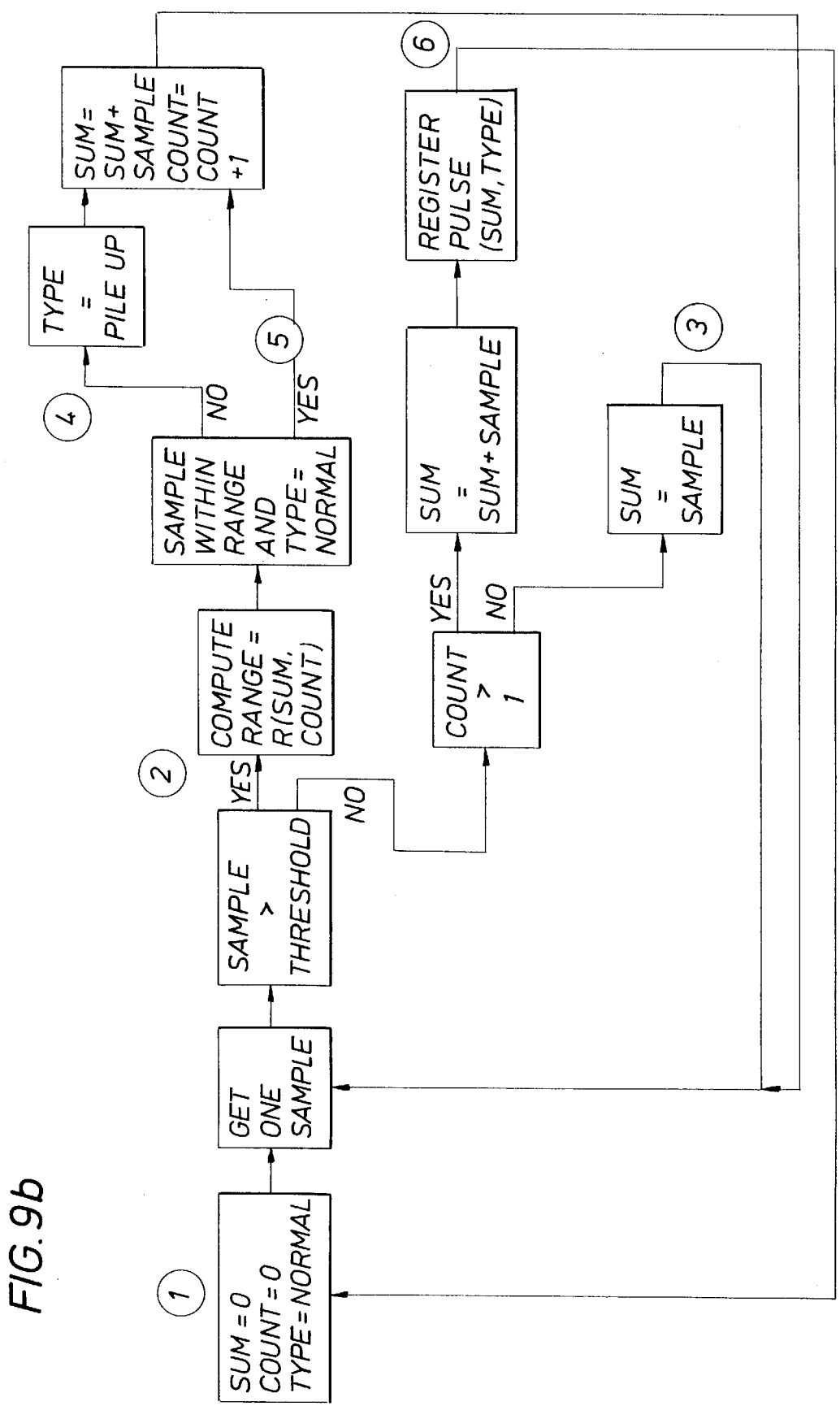
FIG. 9b is a flow diagram of the invention in which for a given pulse shape the value of a sample is related to the values of the previous samples.

FIG. 9a and FIG. 9b show a more general approach to pulse shape discrimination. In this approach the samples in a pulse are continuously compared to the value predicted from the preceding sample or samples. In the implementation a first sample above threshold is detected. The range of permissible values of the second sample is now predicted. The second sample is compared to the prediction. If the sample is not within the predicted range it is flagged (pile up). This process is repeated until one sample falls below the threshold. If any sample was outside of the predicted range the pulse is flagged as a pile up. Depending on the type pulse the "normal" or the "pile up" histogram is incremented. In some applications it will be sufficient to just count the pile ups without storing them in a histogram.

Figure 10:
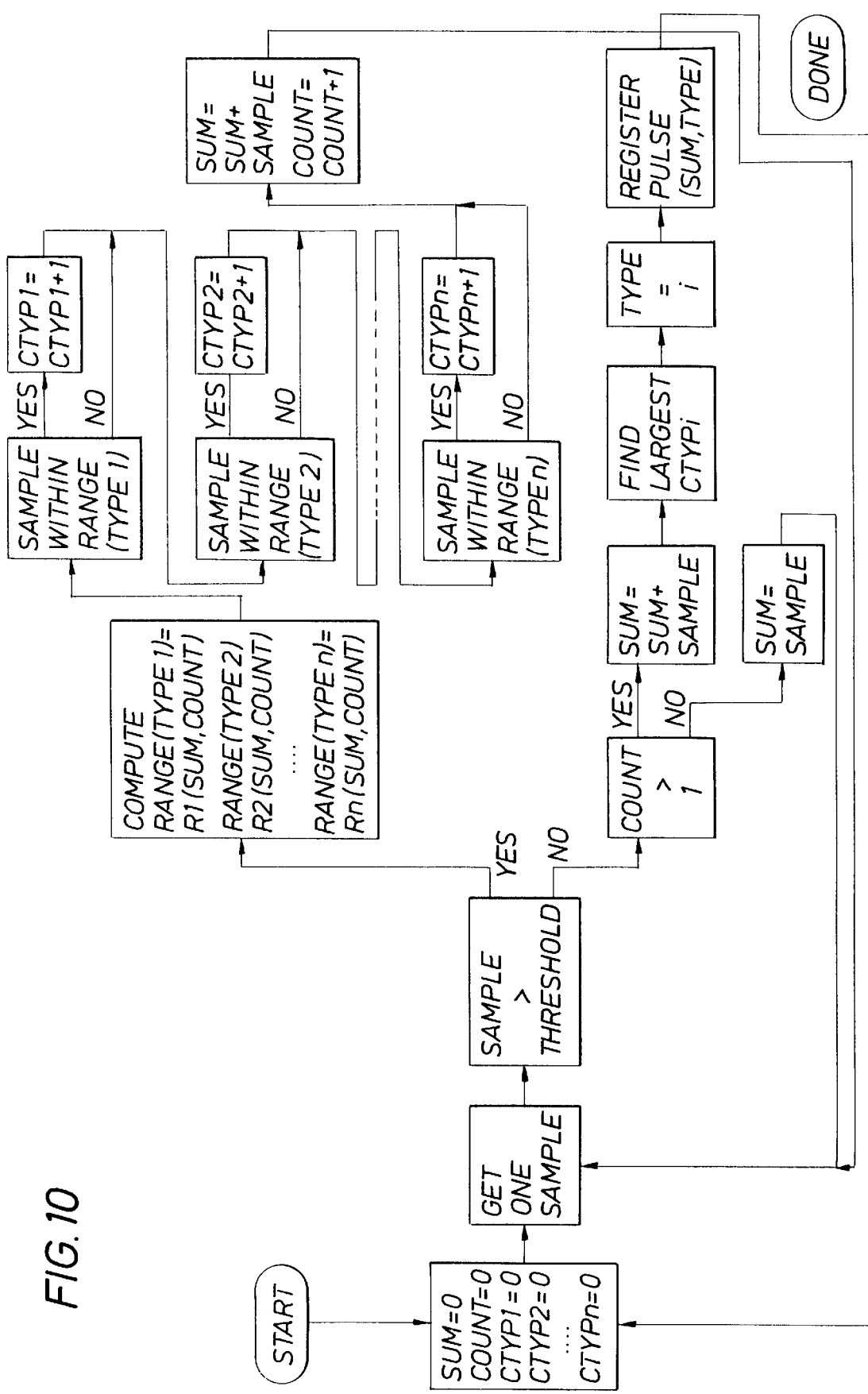
FIG. 10 shows a flow diagram of a general approach pile-up rejection based on pulse shape discrimination.

A more sophisticated approach to pulse shape discrimination is shown in FIG. 10. In this case pulses distinguished based on a variety of conditions and sorted accordingly. This allows distinction between pulse shapes characteristic of different events in a nuclear particle detector.

In yet a different implementation the acquired pulse shape is compared to a predetermined shape. This can be achieved by normalizing the areas of the two pulses before comparing them. The pulses are in agreement if the mean deviation, mean square deviation or another suitable measure are within predetermined limits. A more sophisticated analysis can be done by forming the cross-correlation between the predetermined pulse shape and the measured shape. Use of a plurality of pulse shape will allow the discrimination between multiple pulse shapes for the purpose of pile up rejection and/or pulse shape discrimination.

Pulse Shape Discrimination to Distinguish Nuclear Signals

Figure 11:
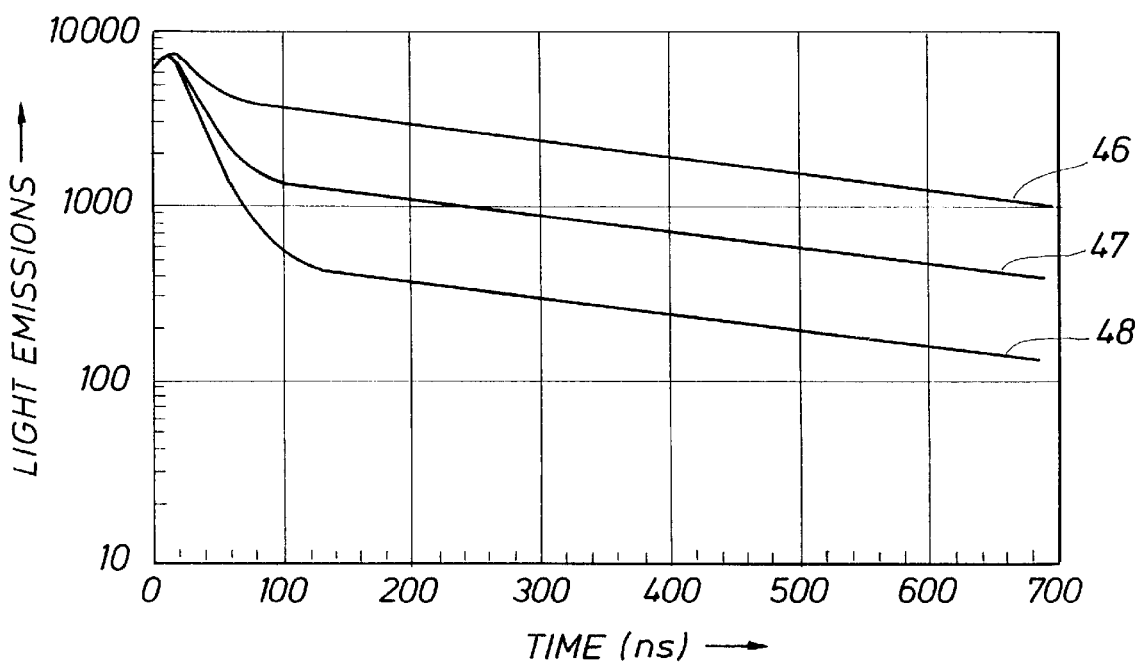
FIG. 11 shows three responses for pulse shape discrimination in neutron spectroscopy with liquid scintillators.

In neutron detection using liquid scintillators, it is often necessary to distinguish between signals created by neutrons and unwanted signals created by gamma-rays. The signals differ from each other in the shape of the pulse emitted by the detector. FIG. 11 shows schematically three measurements Alpha particles 46, Fast neutrons (protons) 47 and Gamma rays 48. The vertical axis being the light emissions and the horizontal axis being time. All three pulses consist of at least two components. The ratio between the amplitudes of the two components depends on the ionization density of the particles in the scintillation material. In a digital approach, the signals can therefore be distinguished by looking at the ratio of the maximum pulse voltage and the voltage at a later time (e.g. after 300 Ns). At the same time a proper integration of the pulse, collecting most of the light, is possible without affecting the discrimination between neutrons and gamma-rays or alpha particles.

Although the apparatus and method of the present invention were described in terms of a specific tool, the concepts in this invention apply to many other logging tools such as neutron porosity tools, carbon/oxygen tools and many non-nuclear tools, as well. The apparatus and method of this invention provide significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method for analyzing the shape of electrical pulses contained in a pulse train, the pulses being representative of the interaction of nuclear particles or gamma-rays with a nuclear detector, comprising the steps of:
   a) detecting the particles or gamma-rays and forming a signal containing pulses representative of the particles or gamma-rays;
   b) sampling the pulses from step (a) at a constant frequency to form a digital image of the pulse train;
   c) measuring the pulse length by counting the number of consecutive samples above a predetermined threshold level;
   d) computing the average number of samples above the threshold level; and
   e) comparing the average number of samples to a predetermined number and adjusting the pulse length based on a comparison between the measured pulse length and a desired pulse length.

2. The method of claim 1 further comprising the step of counting the number of pulses to determine the total pulse count rate.

3. The method of claim 2 wherein the desired pulse length is a function of the total pulse count rate.

4. A method for analyzing the shape of electrical pulses contained in a pulse train, the pulses being representative of the interaction of nuclear particles or gamma-rays with a nuclear detectors, comprising the steps of:
   a) detecting the particles or gamma-rays and forming a signal containing pulses representative of the particles or gamma-rays;
   b) sampling the pulses from step (a) at a constant frequency to form a digital image of the pulse train of the signal;
   c) counting the number of pulses which have a predetermined first number of consecutive samples above a threshold;
   d) counting the number of pulses which have a predetermined second number of consecutive samples above threshold, the first and second number of samples being indicative of pulse length; and
   e) determining a ratio of the first number of pulses to the second number of pulses.

5. The method of claim 4 wherein said first predetermined number of samples is five.

6. The method of claim 4 wherein said second predetermined number of samples is six.

7. The method of claim 4 further comprising the step of adjusting the pulse length in step (d) based on the comparison of the measured ratio of step (e) and a desired ratio.

8. A method for analyzing the shape of electrical pulses representative of the interaction of nuclear particles or gamma-rays with a nuclear detector, comprising the steps of:
   a) detecting the particles or gamma-rays and forming a signal containing pulses representative of the particles or gamma-rays;
   b) sampling the pulses from step (a) at a constant frequency forming a digital image of the signal; and
   c) determining the pulse amplitude from the largest sample in a set of consecutive samples above a predetermined threshold, wherein the number of consecutive samples above threshold which form a valid pulse is a function of the determined pulse amplitude, and wherein the threshold for a valid pulse is adjusted to equal a predetermined fraction of the pulse amplitude.

9. The method of claim 8 where the adjusted threshold is greater than or equal to a predetermined minimum threshold level.

10. The method of claim 9 wherein the number of consecutive samples above the adjusted threshold is counted.

11. The method of claim 10 further comprising the step of rejecting pulses with more than a predetermined number of samples having amplitudes above said threshold amplitude as being pile up pulses.

12. The method of claim 11 further comprising the step of determining an entire area under the pulse, said pulse area being the sum of all consecutive samples above the threshold plus a predetermined number of samples preceding and following the threshold.

13. The method of claim 10 further comprising the step of determining an entire area under the pulse, said area being the sum of all consecutive samples above the adjusted threshold plus a predetermined number of samples preceding and following the threshold.

14. A method for analyzing the shape of electrical pulses representative of the interaction of nuclear particles or gamma-rays with a nuclear detector, comprising the steps of:
   a) detecting the particles or gamma-rays and forming a signal containing pulses representative of the particles or gamma-rays;
   b) sampling the pulses from step (a) at a constant frequency to form a digital image of a pulse train of the signal; and
   c) summing the values of all samples above a threshold plus a predetermined number of samples, n, preceding the threshold to generate a partial area of the pulse, wherein the partial area from the predetermined number of samples, n, is used to predict the area to be obtained when including an n+1 sample.

15. The method of claim 14 wherein a predicted area for n+1 samples is compared to a measured area with n+1 samples and the pulse is rejected as a pile up if the measured area is outside of a predetermined range of predicted values.

16. The method of claim 15 further comprising storing the areas of the pulses the predicted values of which are outside of the predetermined range in a separate histogram.

17. The method of claim 14 further comprising the step of determining an entire area under the pulse, the area being the sum of all the consecutive samples above the threshold, plus a predetermined number of samples preceding and following the threshold.

18. The method of claim 14 in which the partial area from a predetermined number of samples n is used to predict possible results to be obtained when including the next sample.

19. The method of claim 14 wherein a predicted area for n+1 samples is compared to a measured area with n+1 samples and the pulse is added to a histogram depending on which predicted area shows the best agreement with the measured area.

20. A method for analyzing the shape of electrical pulses representative of the interaction of nuclear particles or gamma-rays with a nuclear detector; comprising the steps of:
   a) detecting the particles or gamma-rays and forming a signal containing pulses representative of the particles or gamma-rays;
   b) sampling the pulses from step (a) at a constant frequency forming a digital image of a pulse train of the signal;
   c) determining a first height of the largest sample of a predetermined number of samples after the crossing of a threshold;
   d) determining the height of a second sample from a second predetermined number of samples after the crossing of the threshold;
   e) forming a ratio of the first and second heights; and
   f) rejecting the pulse if the ratio is less than a predetermined number.

21. The method of claim 20 wherein if said ratio is less than a predetermined number, the area, height or another attribute of the pulse are stored in one histogram.

22. The method of claim 20 wherein if said ratio is larger than or equal to a predetermined number, the area height or other pulse attribute is stored in a second histogram.

* * * * *